United States Patent Office 2,900,863
Patented Aug. 25, 1959

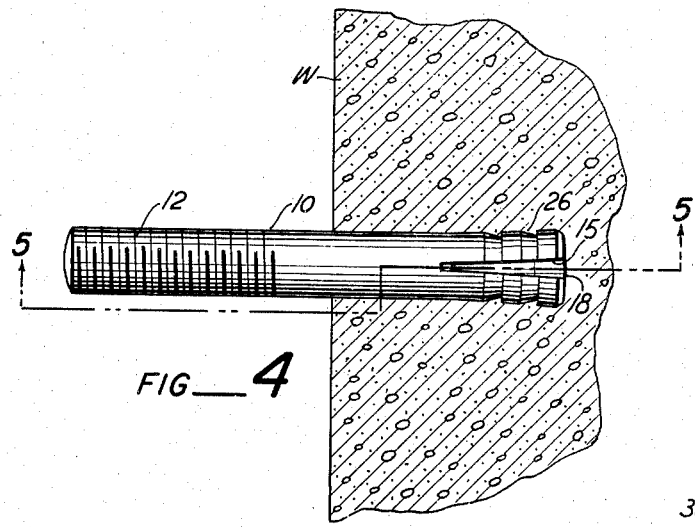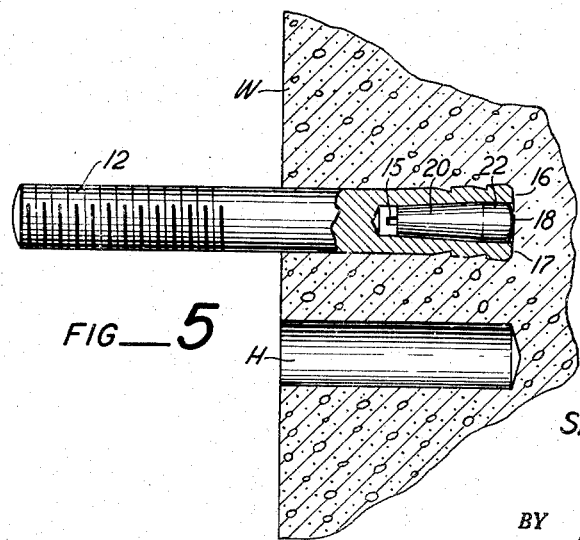

2,900,863

EXPANSION BOLT AND WEDGE WITH A CYLINDRICAL HOLDING SECTION

Samuel J. Maynard, Seattle, Wash., assignor to Kwik-Set Expansion Co., Seattle, Wash., a limited partnership Application March 7, 1955, Serial No. 492,497

1 Claim. (Cl. 85—2)

This invention relates to an anchor device and, more particularly, to an expansion stud anchor adaptable to be secured in concrete, granite and other stone-like material.

Anchor studs are commonly used for attaching plumbing fixtures, for hanging signs from stone, brick or concrete faces of buildings, for mounting of sprinklers, shelving, ventilating apparatus, for hanging pipes, for securing window casings in place, and for anchoring of machinery.

One of the prime difficulties well known to accompany the use of presently available anchor studs is that most of them require the use of a sleeve formed of lead, fibrous material or wood, which must be placed in a hole formed in the stone-like material into which the stud is to be mounted. The studs of the prior art are then seated within said sleeve through a screw action or the like. With such a device, a hole must be formed in the stone-like material that is usually considerably larger than the diameter of the stud being anchored. The formation of such an oversized hole requires extra power and work to get the plug in place and results in an undue weakening of the stone-like material to an extent greater than is necessary.

A further difficulty arising out of the use of the sleeve-anchored expansion studs is that the hole, being larger than the stud to be anchored, is often larger than a hole in a member to be secured by the anchor stud. As a specific example, where a piece of machinery is to have its legs secured to a floor, first the machinery, often heavy and cumbersome, must be moved into the desired position and the floor marked for drilling. Next the machinery is moved out of the way and the drilling operation conducted, the sleeves placed, the anchor studs positioned. Then the machinery is moved back into place and lowered over the anchor studs. This is time consuming and an unnecessarily complicated operation.

Having these and other disadvantages of the prior art structures in mind, it is an important object of my invention to provide an anchor stud of the expansible type which may be placed in a hole formed in stone-like material that is not materially larger than the diameter of the stud shank; to provide an anchor stud which does not require a sleeve or other extraneous fastening member to lock it in the stone-like material; to provide an anchor device of an expansible nature which is not only caused to be locked into stone-like material through a flaring action obtained in the shank of the stud but which, when flared, may also be "locked" after the flaring operation in order to obtain a firm and secure seating of the stud in the base material.

These and other objects of my invention will be more apparent during the course of a reading of the following specification, in which is set forth a preferred form of the invention. It is to be, of course, borne in mind that variations and modifications of the device may be made within the skill of the average mechanic and those which fairly come under the spirit and scope of the invention are considered a part of this invention.

Referring to the drawings in which like reference characters refer to like parts throughout the same, Figure 1 is a view in side elevation of an anchor stud according to my invention;

Figure 2 is a view in side elevation of an expander plug employed in connection with my invention;

Figure 3 is an end view of the stud shown in Figure 1;

Figure 4 illustrates the anchor stud in place in a body of stone-like material as it appears when locked securely in place;

Figure 5 is a view taken along the line 5—5 of Figure 4 with portions shown in section illustrating the internal arrangement of the stud parts when anchored in place; and Figure 6 is an end view of a modified stud construction.

The expansible stud according to my invention comprises a cylindrical shank 10 having a threaded end portion 12 for the reception of a nut. The inner end of the shank 10 is provided with an internal, axial, cylindrical bore 14, the depth of which may be varied according to the circumstances under which the shank is to be used. While shown here as extending only a short distance into the shank, it obviously may pass completely through the pin.

The bored end of the shank is provided with a kerf forming slits 15, 15 which divide the wall of the bore into segments 16 and 17. It is generally preferred that the slits 15 extend axially of the shank 10 and, as shown here, to a point short of the bottom of the bore 14.

Referring to Figure 2, the expander plug 18 which is used in connection with the slit end shank 10 is shown as being of two portions. A first portion 20, designated the entrant portion, has a conical exterior surface which is employed to spread or flare apart the segments 16 and 17. Contiguous with conical portion 20 is an integral cylindrical "locking" portion 22 that is relatively shorter than the entrant portion 20. It is preferable that the diameter of the smaller end of the entrant portion be slightly less than the diameter of the bore 14.

The overall length of an expander plug 18, including the entrant portion 20 and the locking portion 22, is preferably less than the depth of the axial bore 14 as shown here. The diameter of the cylindrical portion of the expander plug is slightly greater than the internal diameter of the axial bore 14 depending upon the degree of flare that is imparted to segments 16, 17.

By this arrangement and construction of parts a very rapid and very firm anchoring of the expansible stud is possible. The usual first step to accomplish an installation is to bore a hole H in a wall W or other body of stone-like material. It is customary that the hole H be of a diameter to receive, in a slip or sliding fit, the shank 10. When the shank is inserted, the expander plug is initially positioned with the smaller end of conical portion 20 partially inserted into bore 14 but in such manner that the external diameter of the stud 10 is not increased over that of its threaded portion. When the stud and the expander plug have been inserted to a depth that the free end of the cylindrical locking portion 22 comes into contact with the inner end of the hole H, the stud is approximately in position for final anchoring. Anchoring is obtained by striking the outer or protruding end of the shank 10 two or three sharp and fairly powerful blows. This results in forcing the conical or entrant portion of the expander plug into the bore 14 to flare the wall segments. Thereafter, the cylindrical portion 22 enters the bore.

The effect of this operation, as best determined from laboratory examination, is that the segments 16, 17 are flared outward of each other or apart and forced into extremely intimate contact with the inner surface of the wall of hole H. The flaring alone does not appear to explain how this stud produces a suitable anchor effect. The final of the seating blows causes the ends of segments 16 and 17 to curve over the point of merger between the conical portion 20 and the cylindrical portion 22. In effect, these wall segments assume a shape that is generally parallel to their original shape but offset axially outward from the original position. In some undetermined manner it has been found that when the stud is merely flared, a suitable anchor is not obtained. However, when it has been passed to a point where the "locking" portion 22 is wholly within the bore 14, as it appears in its deformed condition, the stud is practically non-removable from concrete except under the application of very substantial loading. In the case of a shank of ⅜" diameter embedded to 1⁷⁄₁₆" an excess of 2,000 lbs. applied solely in the axial direction was required to dislodge the stud and then only when a cone of concrete came free intact with the stud.

In Figure 6 I show an end view, similar to Figure 3. In this instance the bored end of shank 10 is provided with cross-kerf slits 35 whereby a plurality of segments 36, 37, 38 and 39 is formed. It will be understood, of course, that such a plurality of segments might be formed through the use of only three radial slits symmetrically arranged to divide the bored end of the shank into three segments.

Also note in Figure 1 that a pair of annular surface grooves 26, 26 is formed on the outer surface of the bored end of the shank whereby spaced apart ridges are provided. While it is possible to obtain a very substantial anchoring of the stud in place without grooves 26 and the spaced apart ridges, there are circumstances in which it is desirable to form such ridges in order to obtain a very positive mechanical interlocking between the outer surface of the stud and the compressed concrete or stone-like wall of the hole H when the stud is anchored in place.

Having thus described my invention, I claim:

An anchor device secured in a cylindrical hole in a stone-like body, comprising: a solid substantially cylindrical shank having substantially the same diameter as said hole and positioned therein and having a threaded end extending out of said hole, said shank having an interiorly smooth axial cylindrical bore extending from its inner end toward the medial portion of the shank and having kerf slits at the bored end dividing the walls of the bore, and an expander plug disposed in said bore having an entrant portion with a conical exterior surface and an integral cylindrical locking portion, the free end of the conical entrant portion being smaller than the diameter of said bore and the conical surface flaring therefrom to said cylindrical portion which is larger than the normal diameter of said bore and smaller than the shank diameter and the cylindrical portion being pressed against the abutting bore wall expanding the same and compressing the corresponding exterior surface of said shank against the walls of said hole.

References Cited in the file of this patent
UNITED STATES PATENTS

| | | |
|---|---|---|
| 747,219 | Preslar | Dec. 15, 1903 |
| 1,164,322 | Yeatman | Dec. 14, 1915 |
| 2,667,037 | Thomas et al. | Jan. 26, 1954 |